United States Patent
Kobayashi et al.

(10) Patent No.: US 11,919,204 B2
(45) Date of Patent: Mar. 5, 2024

(54) MOLD-MAKING METHOD TO GAP, SHIM MANUFACTURING METHOD, MANUFACTURING METHOD OF MOLD-MAKING KIT, AND MOLD-MAKING KIT

(71) Applicant: MITSUBISHI HEAVY INDUSTRIES, LTD., Tokyo (JP)

(72) Inventors: Yusuke Kobayashi, Tokyo (JP); Noriya Hayashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 476 days.

(21) Appl. No.: 17/295,897

(22) PCT Filed: Dec. 24, 2019

(86) PCT No.: PCT/JP2019/050534
§ 371 (c)(1),
(2) Date: May 21, 2021

(87) PCT Pub. No.: WO2020/153082
PCT Pub. Date: Jul. 30, 2020

(65) Prior Publication Data
US 2022/0009131 A1    Jan. 13, 2022

(30) Foreign Application Priority Data
Jan. 25, 2019   (JP) ................. 2019-011223

(51) Int. Cl.
*B29C 33/38*   (2006.01)
*B29C 33/40*   (2006.01)
*C08G 59/22*   (2006.01)

(52) U.S. Cl.
CPC .......... *B29C 33/3842* (2013.01); *B29C 33/40* (2013.01); *C08G 59/223* (2013.01)

(58) Field of Classification Search
CPC .... B29C 33/3842; B29C 33/40; C08G 59/223
See application file for complete search history.

(56) References Cited

U.S. PATENT DOCUMENTS

2020/0190251 A1    6/2020   Hayashi et al.

FOREIGN PATENT DOCUMENTS

| JP | H07314582 A | * | 12/1995 |
| JP | H07326510 A | * | 12/1995 |

(Continued)

OTHER PUBLICATIONS

Socomore video link, DMS 4-828® Moldable Shim Materials, 2016 https://youtu.be/vNhYWF-xtcM?si=0agP-9efkh1TA08M (Year: 2016).*

(Continued)

*Primary Examiner* — Alison L Hindenlang
*Assistant Examiner* — Erica Hartsell Funk
(74) *Attorney, Agent, or Firm* — KANESAKA BERNER AND PARTNERS LLP

(57) ABSTRACT

Provided is a method for making a mold of a gap between components, the method comprising: a step for preparing a curable composition by mixing a resin material with a curing agent that promotes curing of the resin material; a step for cooling the curable composition (M) to a predetermined temperature at which curing of the curable composition is not initiated, so as to manufacture a mold-making kit; a step for placing the mold-making kit in a gap between a first member and a second member so as to fill the gap; a step for curing the mold-making kit between the first member and the second member to mold the mold-making kit into the shape of the gap; and a step for removing the cured mold-making kit from the gap.

8 Claims, 3 Drawing Sheets

(56) References Cited

FOREIGN PATENT DOCUMENTS

WO     2014042115 A1    3/2014
WO     2019043778 A1    3/2019

OTHER PUBLICATIONS

Nakada translation accessed on espacenet Oct. 4, 1995.*
International Search Report and Written Opinoin of International Application No. PCT/JP2019/050534 dated Mar. 17, 2020; 12pp.

* cited by examiner

MOLD-MAKING METHOD TO GAP, SHIM MANUFACTURING METHOD, MANUFACTURING METHOD OF MOLD-MAKING KIT, AND MOLD-MAKING KIT

RELATED APPLICATIONS

The present application is a National Phase of International Application Number PCT/JP2019/050534 filed Dec. 24, 2019 and claims priority of Japanese Application Number 2019-011223 filed Jan. 25, 2019.

TECHNICAL FIELD

The present invention relates to a mold-making method to a gap, a shim manufacturing method, a manufacturing method of a mold-making kit, and a mold-making kit. Priority is claimed on Japanese Patent Application No. 2019-11223, filed Jan. 25, 2019, the content of which is incorporated herein by reference.

BACKGROUND ART

Due to tolerances of individual components or structure assembly tolerances, sometimes a gap occurs between components. A shim (spacer) is inserted into such a gap so that the components are reliably joined together. One of the examples of methods for preparing such a shim is disclosed in Patent Literature 1.

Incidentally, as methods for preparing a shim for reproducing a gap, the following methods are generally used.

(1) Measuring gap with feeler gauge.
(2) Using contact or contactless gap measuring device (such as Gap Master).
(3) Making mold with epoxy resin.

In a case where a mold having a complicated 3D shape or a shim having a highly accurate shape needs to be made, from the viewpoint of gap measurement accuracy, the method (3) is used among the above methods.

CITATION LIST

Patent Literature

[PTL 1] International Publication No. 2014/042115

SUMMARY OF INVENTION

Technical Problem

However, with the method (3), it takes a very long time to prepare a shim due to a resin preparation work, a resin application work, a resin curing time, a work of measuring a cured resin, and the like. Currently, the resin preparation work such as mixing of resin materials is performed at a worksite where a mold is made. Therefore, the working time or working place is greatly limited by the status of the following steps and the like, which leads to a possibility that workability may be reduced. In order to achieve a high production rate in the future, the time taken for preparing a shim needs to be reduced. However, because making a mold costs time and effort, it takes a long time to prepare a shim as well.

Therefore, the present invention provides a mold-making method to a gap, a shim manufacturing method, a manufacturing method of a mold-making kit, and a mold-making kit which make it possible to improve workability and to reduce the time taken for preparing a shim for filling a gap between components.

Solution to Problem

A mold-making method to a gap according to an aspect of the present invention includes a step of preparing a curable composition by mixing a resin material with a curing agent that promotes curing of the resin material, a step of cooling the curable composition to a predetermined temperature at which curing of the curable composition is not initiated, so as to manufacture a mold-making kit, a step of filling a gap between a first member and a second member with the mold-making kit by placing the mold-making kit in the gap, a step of curing the mold-making kit between the first member and the second member so as to mold the mold-making kit into the shape of the gap, and a step of removing the cured mold-making kit from the gap.

As described above, the curable composition is cooled to a predetermined temperature at which curing of the curable composition is not initiated, so that a mold-making kit is manufactured. Therefore, it is not necessary to mix resin materials at a worksite where a mold is actually made. Furthermore, by manufacturing a mold-making kit at a place different from the worksite, keeping the mold-making kit frozen, and bringing the mold-making kit to the worksite when a mold-making work is to be performed, a mold-making work can be carried out. Accordingly, the work of mixing resin materials is hardly limited by the mold-making work, and the workability of mold making can be improved.

The mold-making method to a gap may further include a step of sandwiching the curable composition between films or sheets as a holding member. The curable composition may be cooled in a state of being sandwiched between the films or sheets so that a mold-making kit is manufactured.

As described above, the curable composition is cooled in a state of being sandwiched between films or sheets so that a mold-making kit is manufactured. Therefore, during mold making, the curable composition in a state of being sandwiched between the films or sheets can be placed as it is in a gap. Accordingly, when the curable composition is placed in a gap during the mold-making work, it is possible to prevent the curable composition from coming into direct contact with the first member or the second member. As a result, it is possible to avoid quality deterioration of the first member and the second member that form the gap.

Furthermore, by controlling the surface characteristics of the films or sheets, it is possible to control the adhesion, release properties, or lubricity between the films or sheets and the curable composition or to control the lubricity or release properties between the films or sheets and the first member or the second member. From the viewpoint of conformity, the films or sheets are preferably thin films and preferably have excellent flexibility and excellent stretchability.

The mold-making method to a gap described above may further include a step of packing the curable composition in a film pack as a holding member. The curable composition may be cooled in a state of being packed in the film pack so that the mold-making kit is manufactured.

As described above, the curable composition is cooled in a state of being packed in a film pack so that the mold-making kit is manufactured. Therefore, during mold making, the curable composition in a state of being packed in the film pack can be placed as it is in a gap. Accordingly, when the curable composition is placed in the gap during the mold-making work, it is possible to prevent the curable composition from coming into direct contact with the first member or the second member. As a result, it is possible to avoid quality deterioration of the first member and the second member that form the gap.

Furthermore, by controlling the surface characteristics of the film pack, it is possible to control the adhesion, release properties, or lubricity between the film pack and the curable composition or to control the lubricity or release properties between the film pack and the first member or the second member. From the viewpoint of conformity, the film pack is preferably a thin film and preferably has excellent flexibility and excellent stretchability.

In addition, in a case where the curable composition is packed in the film pack, the curable composition not yet being cured can be prevented from leaking out of the gap. Accordingly, even though the gap between the first member and the second member is large, a mold of the gap can be made.

The mold-making method to a gap may further include a step of performing a blasting treatment on a surface of the holding member that is a surface coming into contact with the curable composition. The curable composition may be cooled together with the holding member having undergone the blasting treatment so that the mold-making kit is manufactured.

In a case where the blasting treatment is performed on the inner surface of the holding member as described above, when the curable composition is cured, the holding member and the curable composition easily adhere to each other. As a result, even though the curable composition cracks when cured, it is possible to avoid separation of the curable composition in the gap, and the cured curable composition can retain its shape corresponding to the shape of the gap. Therefore, a mold can be accurately made.

The mold-making method to a gap may further include a step of applying a release tape or a release agent to the first member and the second member before the gap is filled with the mold-making kit, so that the release tape or the release agent is interposed between the first member and the mold-making kit and between the second member and the mold-making kit.

The curable composition can be placed in the gap between the first member and the second member, in a state where a release tape or a release agent is applied to the first member and the second member. Consequently, it is possible to prevent the curable composition from coming into direct contact with the first member or the second member, and to avoid quality deterioration of the first member and the second member that form the gap. In addition, the use of the release tape or release agent makes it easy to remove the curable composition (mold-making kit) from the gap.

In the step of filling the gap with the mold-making kit in the mold-making method to a gap described above, the mold-making kit may be injected into the space between the first member and the second member.

The injection of the curable composition (mold-making kit) described above enables a worker to easily make a mold without directly touching the curable composition.

In the step of filling the gap with the mold-making kit in the mold-making method to a gap described above, the mold-making kit may be applied to the space between the first member and the second member.

The application of the curable composition (mold-making kit) described above enables a worker to easily make a mold without directly touching the curable composition.

The shim manufacturing method according to an aspect of the present invention may include a step of manufacturing a shim having a shape corresponding to the gap by using the cured mold-making kit after the mold-making method to a gap is performed.

As described above, by manufacturing a mold-making kit at a place different from the worksite where mold is made, keeping the mold-making kit frozen, and bringing the mold-making kit to the worksite when a mold needs to be made, the workability of mold making can be improved. As a result, a shim can be efficiently manufactured.

The manufacturing method of a mold-making kit according to an aspect of the present invention includes preparing a chain curing resin that contains a cationically polymerizable compound containing at least two kinds of compounds selected from the group consisting of a glycidyl ether compound, an alicyclic epoxy compound, and an oxetane compound, a thermal polymerization initiator, and a storage stabilizer, packing the chain curing resin in a film pack or sandwiching the chain curing resin between films or sheets, and cooling the chain curing resin to a predetermined temperature at which curing of the chain curing resin is not initiated, in a state where the chain curing resin is packed in the film pack or sandwiched between the films or sheets, wherein chain curing of the chain curing resin is induced by heat energy generated by a polymerization reaction of the cationically polymerizable compound.

According to this manufacturing method, by manufacturing a mold-making kit at a place different from the worksite, keeping the mold-making kit frozen, and bringing the mold-making kit to the worksite when a mold needs to be made, the workability of mold making can be improved.

The manufacturing method of a mold-making kit according to an aspect of the present invention includes steps of preparing a curable composition by mixing a resin material with a curing agent that promotes curing of the resin material, packing the curable composition in a film pack or sandwiching the curable composition between films or sheets, and cooling the curable composition to a predetermined temperature at which curing of the curable composition is not initiated, in a state where the curable composition is packed in the film pack or sandwiched between the films or sheets.

The mold-making kit according to an aspect of the present invention comprises a chain curing resin containing a cationically polymerizable compound which contains at least two kinds of compounds selected from the group consisting of a glycidyl ether compound, an alicyclic epoxy compound, and an oxetane compound, a thermal polymerization initiator, and a storage stabilizer, and a film pack in which the chain curing resin is packed or films or sheets between which the chain curing resin is sandwiched, wherein chain curing of the chain curing resin is induced by heat energy generated by a polymerization reaction of the cationically polymerizable compound, and the chain curing resin and the film pack or the chain curing resin and the films or sheets are kept at a predetermined temperature at which curing of the chain curing resin is not initiated.

Advantageous Effects of Invention

According to the mold-making method to a gap, shim manufacturing method, manufacturing method of a mold-making kit, and mold-making kit described above, the workability of mold making can be improved, and the time taken for preparing a shim can be reduced.

DESCRIPTION OF EMBODIMENTS

Hereinafter, the mold making method according to an embodiment of the present invention will be described with reference to the drawings.

Figure 1:
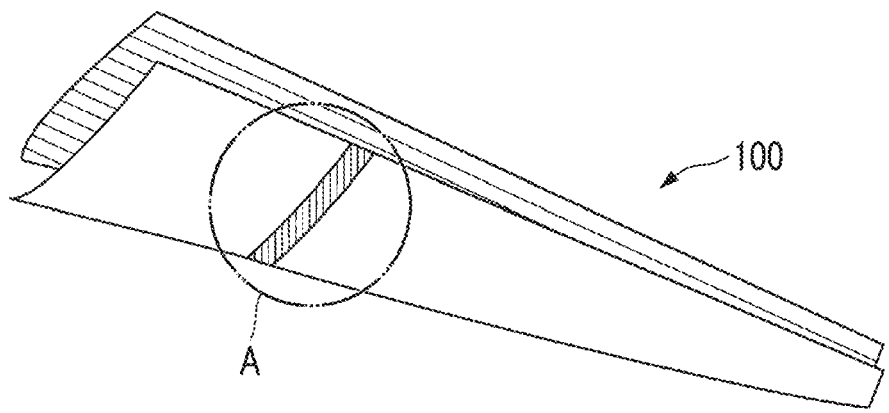
FIG. 1 is a perspective view of a main wing of an aircraft to which the mold making method according to an embodiment of the present invention is applied.
Figure 2:
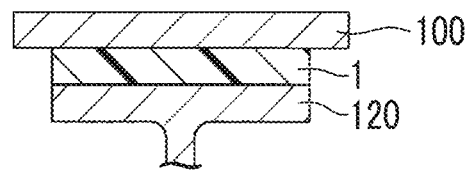
FIG. 2 is a cross-sectional view showing a state where a shim manufactured using the mold making method according to a first embodiment of the present invention is placed in a gap.

As shown in FIGS. 1 and 2, the mold making method of the present embodiment is applied, for example, to a manufacturing method of a shim 1 to be placed in a part A of a main wing 100 of an aircraft. The part A in FIG. 1 is, for example, a portion in which an engine 120 shown in FIG. 2 will be installed. The shim 1 is placed in a gap G between the main wing 100 and the engine 120, and the engine 120 is installed on the main wing 100 in a state where the gap G is filled with the shim 1. Therefore, the shim 1 has a shape corresponding to the gap G.

The mold making method of the present embodiment is used not only to making a mold of the gap G between the main wing 100 and the engine 120 of an aircraft, but also to making other aircraft components, automobiles, or various other industrial products. Accordingly, hereinafter, the main wing will be called a first member 100, and the engine will be called a second member 120.

Next, the procedure of the mold making method of the present embodiment will be described.

Figure 3:
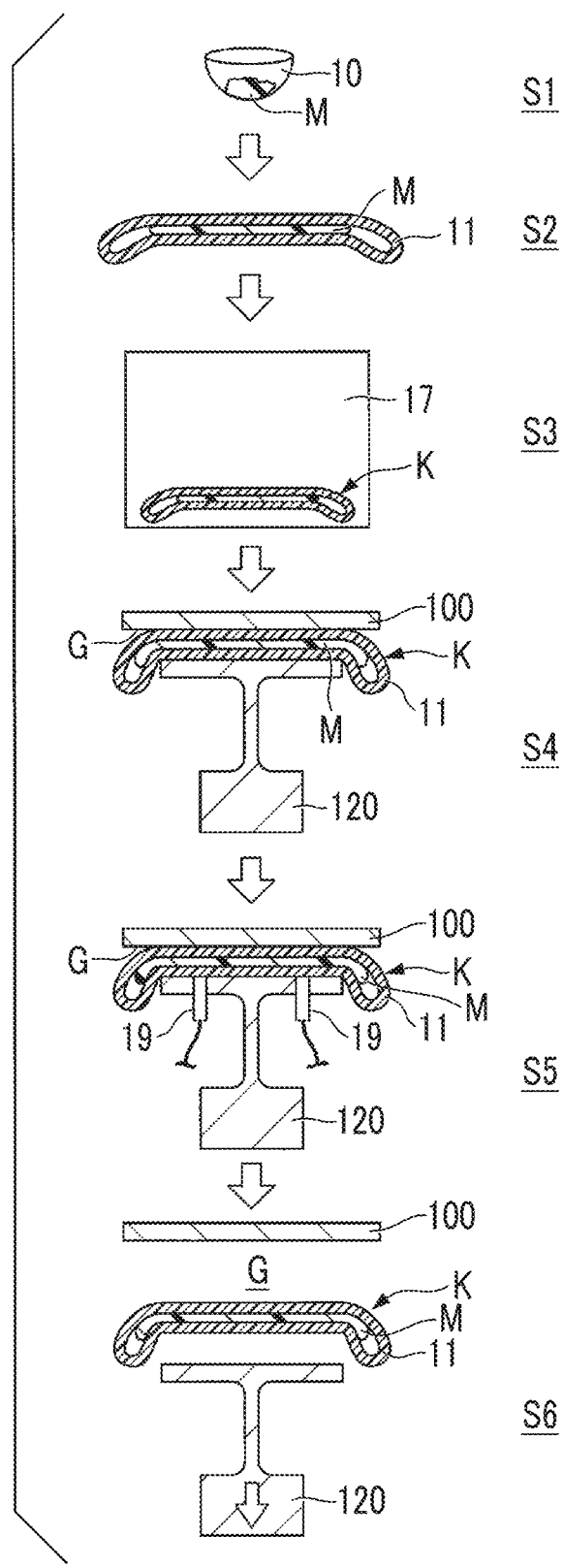
FIG. 3 is a schematic view showing the procedure of a mold making method according to an embodiment of the present invention.
Figure 4:
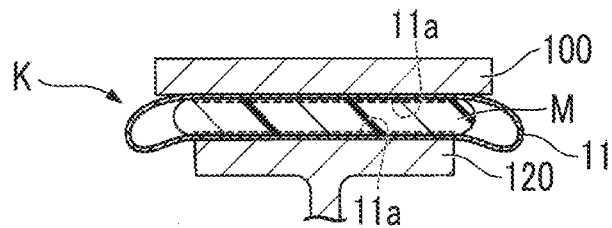
FIG. 4 is a cross-sectional view showing a state where a mold-making kit used in a mold making method according to an embodiment of the present invention is placed in a gap.

As shown in FIGS. 3 and 4, the mold making method of the present embodiment includes the following steps.

Step S1 of preparing curable composition M by mixing resin material.

Step S2 of packing curable composition M in film pack (holding member) 11.

Step S3 of manufacturing mold-making kit K.

Step S4 of placing mold-making kit K in gap G.

Step S5 of molding mold-making kit K into shape of gap G.

Step S6 of removing mold-making kit K from gap G.

In this mold making method, first, Step S1 of mixing a resin material is performed. In Step S1, a curable composition M is prepared by mixing a resin material with a curing agent that promotes curing of the resin material.

As the curable composition M of the present embodiment, an epoxy resin, an oxetane resin, an unsaturated polyester, a chain curing resin, or the like is used.

The epoxy resin contains, for example, jER828 (manufactured by Mitsubishi Chemical Corporation.) or CELLOXIDE 2021P [CEL2021P] (manufactured by DAICEL CORPORATION) as a main agent of a resin material and San-Aid SI-45 (manufactured by SANSHIN CHEMICAL INDUSTRY CO., LTD.) as a curing agent. Furthermore, the epoxy resin contains, for example, Denka fused silica [FB-5D] (manufactured by Denka Company Limited.) as silica.

The oxetane resin contains, for example, ETERNACOLL OXBP (manufactured by UBE INDUSTRIES, LTD.) or ETERNACOLL EHO (manufactured by UBE INDUSTRIES, LTD.) as a main agent of a resin material and San-Aid SI-45 (manufactured by SANSHIN CHEMICAL INDUSTRY CO., LTD.) as a curing agent. Furthermore, the oxetane resin contains, for example, Denka fused silica [FB-5D] (manufactured by Denka Company Limited.) as silica just as the epoxy resin.

The unsaturated polyester contains, for example, a styrene-based resin filler mixture (S-532(A)PT: manufactured by ISHIKAWA INK CORPORATION) as a main agent of a resin material and a peroxide (PERMEK (registered trademark) N: manufactured by NOF CORPORATION) as a curing agent. Furthermore, the unsaturated polyester contains, for example, URE-FIL9 (manufactured by Smooth-On Inc.) as silica.

The chain curing resin contains, for example, a cationically polymerizable compound as a main agent of a resin material, a thermal polymerization initiator as a curing agent, and a storage stabilizer. The cationically polymerizable compound contains at least two kinds of compounds selected from the group consisting of a glycidyl ether compound, an alicyclic epoxy compound, and an oxetane compound. The chain curing of the chain curing resin can be induced by heat energy generated by a polymerization reaction of the cationically polymerizable compound. The temperature at which the chain curing can be initiated can be adjusted depending on the type of thermal polymerization initiator. Each component of the chain curing resin will be specifically described later.

In the process of preparing the curable composition M, it is preferable to keep the temperature of the resin material at 20° C. or lower. For example, it is possible to adopt a method of mixing the resin material in a mixing container 10 in a state where the mixing container 10 is immersed in ice water, a method of mixing the resin material in a state where the mixing container 10 is placed on a cooler (not shown in the drawing), or the like. Furthermore, the resin material may be cooled alone first in a refrigerator or a freezer (not shown in the drawing), and then mixed with a curing agent.

In order to make a mold in an allowable temperature range required for preparing the shim 1, the temperature at which curing of the curable composition M can be initiated is preferably 65° C. or lower.

The temperature at which curing of the curable composition M can be initiated is more preferably 45° C. or lower. The lower limit of the temperature at which curing can be initiated is not particularly limited, and is appropriately selected in consideration of the balance with the pot life which will be described later. From the viewpoint of securing the pot life, the temperature at which curing of the curable composition M can be initiated is preferably high. The temperature at which curing can be initiated may be, for example, 0° C. or higher, 5° C. or higher, 10° C. or higher, 15° C. or higher, or 20° C. or higher.

The temperature at which curing can be initiated is particularly preferably about room temperature. Herein, "room temperature" means a temperature in a range of 23±3° C.

Next, Step S2 of packing the curable composition M is performed. In Step S2, the curable composition M is packed in a film pack 11. The film pack 11 is, for example, a bag-shaped resin pack made of plastic such as polyvinyl chloride, polyethylene, polypropylene, polyester, or nylon. The thickness of the film pack 11 is about 0.01 mm to 0.02 mm. Furthermore, the film pack 11 may be provided with a fastener capable of sealing the curable composition M in the pack.

The film pack 11 does not need to be a resin pack, and may be formed of a metal thin film. From the viewpoint of conformity in making a mold, the film pack 11 is preferably formed of a flexible material in the form of a thin film. The film pack 11 is preferably formed of a stretchable material such as rubber. Ideally, the film pack 11 is formed of a strong thin film that is 0.001 mm thick for example.

In the present embodiment, before Step S2 of packing the curable composition M is performed, a step of performing a blasting treatment on the inner surface of the film pack 11 is carried out. In this step, as shown in FIG. 4, the inner surface of the film pack 11, that is, the surface coming into contact with the curable composition M is called a rough surface 11a. Note that the blasting treatment is not necessarily performed.

Next, Step S3 of manufacturing the mold-making kit K is performed. In Step S3, for example, in a freezer 17, the curable composition M is cooled to a predetermined temperature at which curing of the curable composition M is not initiated. The predetermined temperature is preferably −40° C. or lower, and more preferably −60° C. or lower. Furthermore, the predetermined temperature is preferably a temperature at which the mold-making kit K can be kept frozen for a period of about 3 weeks without performance deterioration. In the present embodiment, the curable composition M is cooled in a state of being packed in a film pack 11, so that the mold-making kit K is manufactured.

Next, Step S4 of placing the mold-making kit K in the gap G is performed. In Step S4, the mold-making kit K taken out of the freezer 17 is placed and positioned in the gap G between a first member 100 and a second member 120, so that the gap G is filled.

Next, Step S5 of molding the mold-making kit K into the shape of the gap G is performed. In Step S5, the mold-making kit K is cured between the first member 100 and the second member 120, so that the mold-making kit K is molded into the shape of the gap G. At this time, it is preferable to adjust the components of the curable composition M so that the mold-making kit K is cured at room temperature without using a heater 19. The room temperature mentioned herein is the temperature of the environment in which the mold-making kit K is placed in the gap G. Note that the heater 19 can be used as shown in FIG. 3. The heater 19 is provided so as to penetrate the film pack 11 and come into contact with the curable composition M.

It is preferable to adjust the cooling temperature of the curable composition M, the ratio of components of the curable composition M, and the like, so that the pot life of the mold-making kit K is 30 minutes or more and 2 hours or less. For example, in a case where the curable composition M is a chain curing resin, the pot life can be adjusted by the content of the storage stabilizer, the type of polymerization initiator, the components of the cationically polymerizable resin, the amount of the filler added, and the like.

The pot life mentioned in the present embodiment refers to the time taken for placing the mold-making kit K in the gap G and finishing positioning after the mold-making kit K is taken out of the freezer 17.

The curable composition M is preferably a resin that may be cured to reach the Shore D hardness of 60 or higher within 6 hours at room temperature.

Furthermore, the curable composition M is preferably a resin that may be cured to reach the Shore D hardness of 30 or higher within 1 hour in a case where the resin is heated to 60° C. by the heater 19. The shore D hardness is a value defined by JIS K 7215.

Lastly, Step S6 of removing the mold-making kit K from the gap G is performed. In Step S6, the second member 120 is separated from the first member 100 so that the gap G is opened, and the cured mold-making kit K is removed from the gap G. Then, by using the mold-making kit K, the shim 1 having a shape corresponding to the gap G is manufactured. The shim 1 is manufactured, for example, by cutting GFRP (Glass Fiber Reinforced Plastics) in the shape of the mold-making kit K.

In a case where the mold making method of the present embodiment described above is used, by preparing the curable composition M and then cooling the curable composition M to a predetermined temperature at which curing of the curable composition M is not initiated, it is possible to manufacture the mold-making kit K that can be stored for a predetermined period of time.

For example, by manufacturing the mold-making kit K at a factory different from a worksite where a mold will be actually made, keeping the mold-making kit K frozen, and bringing the mold-making kit K to the worksite when a mold needs to be made, a mold-making work can be performed. Therefore, it is not necessary to perform a resin material-mixing work at the worksite where a mold is made, immediately before a mold is actually made.

As a result, the work of preparing a curable composition is not limited by the following step, the mold-making work, and the workability of mold making can be improved. Therefore, the time required for preparing the shim 1 can be significantly reduced.

The mold-making kit K is placed in the gap G and left to naturally thaw while the positioning of the mold-making kit K is being carried out. Therefore, depending on the environmental temperature of the worksite where a mold is made, it is not necessary to forcedly thaw the mold-making kit K.

The curable composition M is cooled in a state of being packed in the film pack 11, so that the mold-making kit K is manufactured. Therefore, during mold making, the curable composition M in a state of being packed in the film pack 11 can be placed as it is in the gap G. Accordingly, during mold making, it is possible to prevent the curable composition M from coming into direct contact with the first member 100 or the second member 120. As a result, it is possible to avoid quality deterioration of the first member 100 or the second member 120 that form the gap G.

Furthermore, by controlling the surface characteristics of the film pack 11, it is possible to control the adhesion, release properties, or lubricity between the film pack 11 and the curable composition M or to control the lubricity or release properties between the film pack 11 and the first member 100 or the second member 120.

In a case where the curable composition M is packed in the film pack 11, when the mold-making kit K is placed in the gap G, the curable composition M not yet being cured can be prevented from leaking out of the gap G. Accordingly, even though the gap G between the first member 100 and the second member 120 is large, a mold of the gap G can be made. For example, in a case where a chain curing resin not being packed in the film pack 11 is placed in the gap G, because the chain curing resin has relatively low viscosity, if the thickness of the gap G (distance between the first member 100 and the second member 120) is more than 3.5 mm, there is a possibility that a mold of the gap G could not be made. However, it has been confirmed that in a case where a chain curing resin packed in the film pack 11 is used in the mold-making kit K, a mold of the gap G can be made as long as the gap G has a thickness of about 10 mm or less.

In a case where a blasting treatment is performed on the inner surface of the film pack 11, when the curable composition M is cured, the film pack 11 and the curable composition M easily adhere to each other. As a result, even though the curable composition M cracks when cured, it is possible to avoid the separation of the curable composition M in the gap G, and the cured curable composition M can retain its shape corresponding to the shape of the gap G. Therefore, a mold of the gap G can be can be accurately made.

In a case where the mold-making kit K is kept frozen, the curable composition M can be easily peeled from the film pack 11. Accordingly, a thermocouple for monitoring the change in the curing temperature can be inserted between the film pack 11 and the curable composition M, or a shim can be placed in the curable composition M.

First Modification Example

Figure 5:
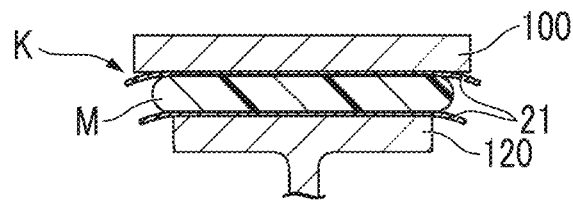
FIG. 5 is a cross-sectional view showing a state where a mold-making kit of a first modification example used in a mold making method according to an embodiment of the present invention is placed in a gap.

As shown in FIG. 5, films or sheets 21 formed of the same material as the film pack 11 may be used instead of the film pack 11. That is, instead of Step S2 of packing the curable composition M in the film pack 11, a step of sandwiching the curable composition M between a pair of films or sheets 21 may be performed. Then, the curable composition M is cooled in a state of being sandwiched between the films or sheets 21 so that the mold-making kit K is manufactured. During mold making, the mold-making kit K is placed in the gap G so that the films or sheets 21 come into contact with the first member 100 and the second member 120.

In a case where the mold-making kit K having the films or sheets 21 is used, during mold making, the curable composition M in a state of being sandwiched between the films or sheets 21 can be placed as it is in the gap G. Accordingly, when the curable composition M is placed in the gap G during the mold-making work, it is possible to prevent the curable composition M from coming into direct contact with the first member 100 or the second member 120. As a result, it is possible to avoid quality deterioration of the first member 100 or the second member 120 that form the gap G.

Furthermore, by controlling the surface characteristics of the films or sheets 21, it is possible to control the adhesion, release properties, or lubricity between the films or sheets 21 and the curable composition M or to control the lubricity or release properties between the films or sheets 21 and the first member 100 or the second member 120. In view of conformity, it is preferable that the films or sheets 21 be thin films having excellent flexibility and excellent stretchability, just as the film pack 11.

In addition, a blasting treatment may be performed on the inner surface of the films or sheets 21 (the surface coming into contact with the curable composition M) just as the film pack 11 so that a rough surface is formed.

Second Modification Example

Figure 6:
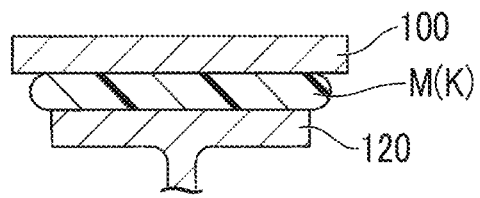
FIG. 6 is a cross-sectional view showing a state where a mold-making kit of a second modification example used in the mold making method according to the embodiment of the present invention is placed in a gap.

As shown in FIG. 6, the mold-making kit K may be manufactured without using the film pack 11 and the films or sheets 21. That is, the curable composition M may be cooled as it is so that the mold-making kit K is manufactured. In this case, it is possible to reduce the time and effort in manufacturing the mold-making kit K.

Figure 7:
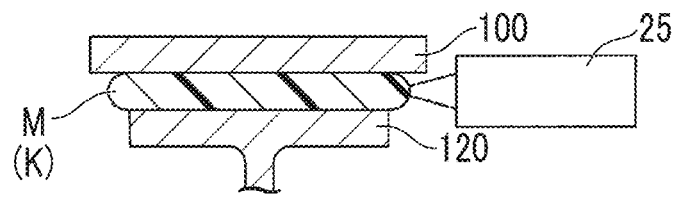
FIG. 7 is a cross-sectional view showing a first method of placing the mold-making kit of the second modification example used in the mold making method according to the embodiment of the present invention is placed in a gap.
Figure 8:
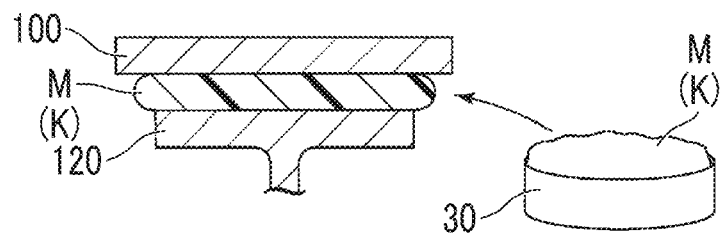
FIG. 8 is a cross-sectional view showing a second method of placing the mold-making kit of the second modification example used in the mold making method according to the embodiment of the present invention is placed in a gap.

In a case where the mold-making kit K shown in FIG. 6 is used, when the mold-making kit K will be placed in the gap G so as to fill the gap G, the mold-making kit K taken out of the freezer 17 may be injected into the gap G by using, for example, a caulking gun 25 shown in FIG. 7. Furthermore, as shown in FIG. 8, a paste-like mold-making kit K may be put in a container 30 and applied to the first member 100 and the second member 120. The mold-making kit K taken out of the freezer 17 may be left to thaw and then put in the caulking gun 25 or the container 30. Alternatively, the mold-making kit K taken out of the freezer 17 may be left to thaw in a state of being put in the caulking gun 25 or the container 30. In a case where the curable composition M (mold-making kit K) is injected into the gap or applied to the first member 100 and the second member 120 as described above, a worker can make a mold without directly touching the curable composition M.

Figure 9:
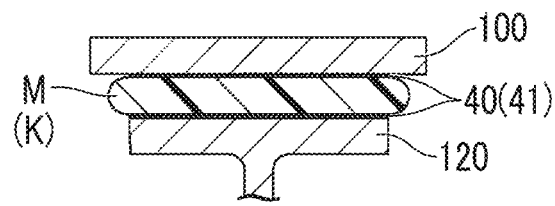
FIG. 9 is a cross-sectional view showing a third method of placing the mold-making kit of the second modification example used in the mold making method according to the embodiment of the present invention is placed in a gap.

Furthermore, as shown in FIG. 9, a step may be additionally performed which is for applying a release tape 40 or a release agent 41 to the first member 100 and the second member 120 so that the release tape or the release agent is interposed between the first member 100 and the mold-making kit K and between the second member 120 and the mold-making kit K. Then, it is possible to adopt a method of applying the curable composition M (mold-making kit K) directly to the release tape 40 or the release agent 41 or injecting the curable composition M (mold-making kit K) into the surface of the release tape 40 or the release agent 41 by using a caulking gun 25.

The release tape 40 is, for example, a pressure sensitive adhesive tape made less sticky by coating or a surface treatment. The release agent 41 is a coating agent that makes a substance non-sticky.

In this case, the curable composition M can be placed in the gap G between the first member 100 and the second member 120, in a state where the release tape 40 or the release agent 41 is applied to the first member 100 and the second member 120. As a result, it is possible to prevent the curable composition M from coming into direct contact with the first member 100 or the second member 120. Therefore, it is possible to avoid quality deterioration of the first member 100 or the second member 120 that form the gap G. In addition, the use of the release tape 40 or the release agent 41 makes it easy to remove the mold-making kit K from the gap G.

Hitherto, the embodiments of the present invention have been specifically described with reference to drawings. However, the configurations in the above embodiments and modification examples thereof, combinations of the configurations, and the like are merely an example. Within the scope of the gist of the present invention, the addition, omission, and substitution of configurations and other modifications can be carried out. Furthermore, the present invention is limited not by the above embodiments but only by the scope of claims.

For example, the resin material or the curing agent of the curable composition M are not limited to the above materials, and may be any material that can be made into a kit by cooling and can be cured in the gap G. In addition, the following resin can be used as the chain curing resin.

[Chain Curing Resin]

The chain curing resin contains a cationically polymerizable compound (resin material), a thermal polymerization initiator (curing agent), and a storage stabilizer. The chain curing resin may further contain a filler. Furthermore, if necessary, the chain curing resin may further contain components other than the cationically polymerizable compound, the thermal polymerization initiator, the storage stabilizer, and the filler, as long as the effects of the present invention are not impaired.

For example, the content of the thermal polymerization initiator is preferably 0.3 to 3 parts by mass with respect to 100 parts by mass of the cationically polymerizable compound. In addition, for example, the content of the storage stabilizer is preferably 0.3 to 5 parts by mass with respect to 100 parts by mass of the thermal polymerization initiator.

(Cationically Polymerizable Compound)

The cationically polymerizable compound contains at least two kinds of compounds selected from the group consisting of a glycidyl ether compound, an alicyclic epoxy compound, and an oxetane compound.

The cationically polymerizable compound may further contain other cationically polymerizable compounds that are not a glycidyl ether compound, an alicyclic epoxy compound, and an oxetane compound.

The glycidyl ether compound has one or more glycidyl ether groups.

Examples of the glycidyl ether compound include a bisphenol A-type diglycidyl ether compound, a bisphenol F-type diglycidyl ether compound, a hydrogenated bisphenol-type glycidyl ether compound, other aromatic glycidyl ether compounds, an aliphatic glycidyl ether compound, and the like. One kind of any of these glycidyl ether compounds may be used alone, or two or more kinds of these glycidyl ether compounds may be used in combination.

As the glycidyl ether compound, from the viewpoint of availability, heat resistance, rigidity, strength characteristics, versatility, low cost, and the like, at least one kind of compound selected from the group consisting of a bisphenol A-type diglycidyl ether compound and a bisphenol F-type diglycidyl ether compound is particularly preferable.

The alicyclic epoxy compound has one or more alicyclic epoxy groups. The alicyclic epoxy group refers to an epoxy group having a structure in which one oxygen atom is bonded to two carbon atoms (generally, adjacent carbon atoms) among the carbon atoms bonded together to form an aliphatic ring of an alicyclic compound.

Examples of the alicyclic epoxy compound include dicyclopentadiene dioxide, limonene dioxide, di(3,4-epoxycyclohexyl)adipate, (3,4-epoxycyclohexyl)methyl-3,4-epoxycyclohexane carboxylate, 3,4-epoxy-6-methylcyclohexylmethyl-3,4-epoxy-6-methylcyclohexane carboxylate, ethylene-1,2-di(3,4-epoxycyclohexane carboxylic acid) ester, and the like. One kind of any of these alicyclic epoxy compounds may be used alone, or two or more kinds of these alicyclic epoxy compounds may be used in combination.

As the alicyclic epoxy compound, from the viewpoint of high reactivity, heat resistance, rigidity, strength characteristics, versatility, availability, low cost, and the like, 3,4-epoxy-6-methylcyclohexylmethyl-3,4-epoxy-6-methylcyclohexane carboxylate is particularly preferable.

The oxetane compound has one or more oxetane groups.

Examples of the oxetane compound include 3-ethyl-3-hydroxymethyl oxetane (hereinafter, also described as "EHO"), a bisphenol A-type oxetane compound, a bisphenol oxetane compound, a bisphenol S-type oxetane compound, a xylylene-type oxetane compound, a phenol novolac-type oxetane compound, a cresol novolac-type oxetane compound, an alkylphenol novolac-type oxetane compound, a biphenol-type oxetane compound, a bixylenol type oxetane compound, a naphthalene-type oxetane compound, a dicyclopentadiene-type oxetane compound, an oxetane compound of a condensate of phenols and an aromatic aldehyde having a phenolic hydroxyl group, and the like. One kind of any of these oxetane compounds may be used alone, or two or more kinds of these oxetane compounds may be used in combination.

As the oxetane compound, from the viewpoint of high reactivity, at least one kind of compound selected from the group consisting of 4,4'-bis[(3-ethyl-3-oxetanyl)methoxymethyl]biphenyl (hereinafter, also described as "OXBP") and EHO is preferable. In view of obtaining a cured product having higher heat resistance, OXBP is preferable. In view of low cost, EHO is preferable.

Examples of other cationically polymerizable compounds include an epoxidized olefin, a vinyl ether compound, and the like.

Examples of the epoxidized olefin include epoxidized linseed oil, epoxidized castor oil, epoxidized soybean oil, and the like.

Examples of the vinyl ether compound include di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, and trimethylolpropane trivinyl ether; monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether, and the like.

One kind of any of these cationically polymerizable compounds may be used alone, or two or more kinds of these cationically polymerizable compounds may be used in combination.

(Thermal Polymerization Initiator)

The thermal polymerization initiator is a compound capable of generating a Lewis acid or a protonic acid by thermal decomposition. By the action of the Lewis acid or protonic acid, the polymerization reaction of the cationically polymerizable compound is initiated.

As the thermal polymerization initiator, a compound capable of generating a Lewis acid or a protonic acid by decomposing at a temperature of 65° C. or lower is preferable, because such a compound can induce chain curing of the chain curing resin at a temperature of 65° C. or lower. Examples of such a compound include a sulfonium salt represented by Formula (I-1), a sulfonium salt represented by Formula (I-2), and the like. One kind of any of these thermal polymerization initiators may be used alone, or two or more kinds of these thermal polymerization initiators may be used in combination.

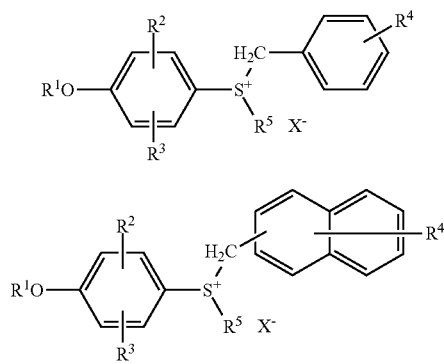

$R^2$ represents a hydrogen atom, a methyl group, an acetyl group ($CH_3CO$), or a methoxycarbonyl group ($CH_3OCO$), $R^2$ and $R^3$ each independently represent a hydrogen atom, a halogen atom, or an alkyl group having 1 to 4 carbon atoms, $R^4$ represents a hydrogen atom, a halogen atom, a nitro group, a methyl group, or a methoxy group, $R^5$ represents an alkyl group having 1 to 4 carbon atoms, and X represents $SbF_6$, $PF_6$, $AsF_6$, or $BF_4$.

As the thermal polymerization initiator, from the viewpoint of chain curing characteristics, at least one kind of compound selected from the group consisting of sulfonium salts represented by Formula (I-1) or (I-2) is preferable.

The sulfonium salt represented by Formula (I-1) or (I-2) is preferably a sulfonium salt in which $R^1$ represents a hydrogen atom, an acetyl group, or a methoxycarbonyl group, $R^2$ and $R^3$ each represent a hydrogen atom, $R^4$ represents a hydrogen atom, a halogen atom, a nitro group, or a methyl group, and $R^5$ represents a methyl group. Particularly, a sulfonium salt represent by Formula (I-1) is preferable in which $R^1$ represents a methoxycarbonyl group, $R^2$ and $R^3$ each represent a hydrogen atom, $R^4$ represents a hydrogen atom, $R^5$ represents a methyl group, and X represents $SbF_6$. That is, a sulfonium salt represented by Formula (I-1-1) is preferable.

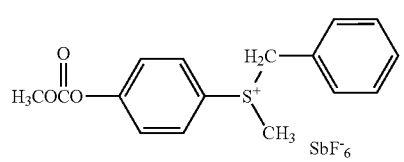

(Storage Stabilizer)

The storage stabilizer is a compound capable of capturing a Lewis acid or a protonic acid generated by the decomposition of the thermal polymerization initiator. In a case where the chain curing resin contains the storage stabilizer, the polymerization of the cationically polymerizable compound is inhibited, and the pot life of the chain curing resin is extended.

Examples of the storage stabilizer include a sulfonium salt represented by Formula (II) and the like. One kind of any of these storage stabilizers may be used alone, or two or more kinds of these storage stabilizers may be used in combination.

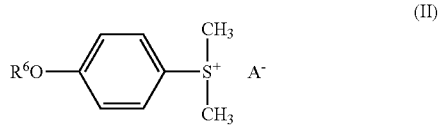

$R^6$ represents an acetyl group or a methoxycarbonyl group, and A represents $CH_3SO_4$.

As the storage stabilizer, from the viewpoint of storage stability characteristics, at least one kind of compound selected from the group consisting of sulfonium salts represented by Formula (II) is preferable.

(Filler)

The filler is used for the purposes of adjusting properties, such as viscosity, of the chain curing resin, reducing the amount of heat generated during curing by reducing the proportion of the cationically polymerizable compound, inhibiting cure shrinkage/improving dimensional stability, improving hardness, improving rigidity, and the like.

Examples of the filler include glass, silica, ceramics, plastics, metals, and the like. In view of property stability, dispersibility, availability, variety of form•performance, low cost, and the like, at least one kind of material selected from the group consisting of glass, silica, and ceramics is preferable.

The filler is, for example, in the form of powder, fiber, clay, or the like. Among these, the filler in the form of powder is preferable, because such a filler is easy to mix and prepare and easily conforms to a shape (for example, this filler excellently fills up a gap portion and easily conforms to a shape when crushed).

The filler in the form of powder may have a particle size distribution.

In order to control the viscosity characteristics of the chain curing resin, a plurality of fillers in the form of powder having different average particle sizes may be used in combination.

As the filler, silica in the form of powder is preferable because such a filler is inexpensive, available as commercial products having various particle sizes, and makes it easy to select the particle size.

(Other Components)

Examples of other components include a sensitizer, a curing accelerator, a pigment/dye, an anti-foaming agent, a viscosity adjuster, and the like. One kind of any of these other components may be used alone, or two or more kinds of these other components may be used in combination.

INDUSTRIAL APPLICABILITY

The present invention relates to a mold-making method to a gap, a shim manufacturing method, a manufacturing method of a mold-making kit, and a mold-making kit. According to the present invention, it is possible to improve the workability of mold making and shorten the time taken for preparing a shim that will fill a gap between components.

REFERENCE SIGNS LIST

1 . . . Shim
10 . . . Mixing container

11 . . . Film pack (holding member)
11a . . . Rough surface
17 . . . Freezer
19 . . . Heater
21 . . . Film or sheet (holding member)
25 . . . Caulking gun
30 . . . Container
40 . . . Release tape
41 . . . Release agent
100 . . . First member
120 . . . Second member
M . . . Curable composition
K . . . Mold-making kit
G . . . Gap

The invention claimed is:

1. A mold-making method to a gap comprising:
a step of preparing a curable composition by mixing a resin material with a curing agent that promotes curing of the resin material;
a step of cooling the curable composition to a predetermined temperature at which curing of the curable composition is not initiated, so as to manufacture a mold-making kit;
a step of filling a gap between a first member and a second member with the mold-making kit by placing the mold-making kit in the gap;
a step of curing the mold-making kit between the first member and the second member so as to mold the mold-making kit into a shape of the gap; and
a step of removing the cured mold-making kit from the gap.

2. The mold-making method to a gap according to claim 1, further comprising:
a step of sandwiching the curable composition between films or sheets as a holding member,
wherein the curable composition is cooled in a state of being sandwiched between the films or sheets so that the mold-making kit is manufactured.

3. The mold-making method to a gap according to claim 1, further comprising:
a step of packing the curable composition in a film pack as a holding member,
wherein the curable composition is cooled in a state of being packed in the film pack so that the mold-making kit is manufactured.

4. The mold-making method to a gap according to claim 2, further comprising:
a step of performing a blasting treatment on a surface of the holding member that is a surface coming into contact with the curable composition,
wherein the curable composition is cooled together with the holding member having undergone the blasting treatment so that the mold-making kit is manufactured.

5. The mold-making method to a gap according to claim 1, further comprising:
a step of applying a release tape or a release agent to the first member and the second member before the gap is filled with the mold-making kit, so that the release tape or the release agent is interposed between the first member and the mold-making kit and between the second member and the mold-making kit.

6. The mold-making method to a gap according to claim 1,
wherein in the step of filling a gap with the mold-making kit, the mold-making kit is injected into a space between the first member and the second member.

7. The mold-making method to a gap according to claim 1,
wherein in the step of filling a gap with the mold-making kit, the mold-making kit is applied to a space between the first member and the second member.

8. A shim manufacturing method comprising:
a step of manufacturing a shim having a shape corresponding to the gap by using the cured mold-making kit after the mold-making method to a gap according to claim 1 is performed.

* * * * *